(12) United States Patent
Beretta et al.

(10) Patent No.: US 8,677,329 B2
(45) Date of Patent: Mar. 18, 2014

(54) METHODS AND APPARATUSES FOR A COMPILER SERVER

(75) Inventors: Robert Beretta, South Lake Tahoe, CA (US); Nicholas William Burns, Cupertino, CA (US); Nathaniel Begeman, Cupertino, CA (US); Phillip Kent Miller, Norman, OK (US); Geoffrey Grant Stahl, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1322 days.

(21) Appl. No.: 12/477,859

(22) Filed: Jun. 3, 2009

(65) Prior Publication Data

US 2010/0313079 A1 Dec. 9, 2010

(51) Int. Cl.
*G06F 9/45* (2006.01)

(52) U.S. Cl.
USPC ........... 717/140; 717/136; 717/138; 717/139; 717/145; 717/146; 717/147; 717/148; 717/149; 717/151; 717/153; 714/E11.209

(58) Field of Classification Search
USPC ................................................. 717/140–161
See application file for complete search history.

(56) References Cited

U.S. PATENT DOCUMENTS

| | | | | |
|---|---|---|---|---|
| 5,313,635 A * | 5/1994 | Ishizuka et al. | ............... | 717/173 |
| 5,634,114 A | 5/1997 | Shipley | | |
| 5,649,099 A * | 7/1997 | Theimer et al. | ................... | 726/4 |
| 5,848,274 A * | 12/1998 | Hamby et al. | ................ | 717/153 |
| 5,920,721 A | 7/1999 | Hunter et al. | | |
| 5,970,249 A * | 10/1999 | Holzle et al. | .................. | 717/153 |
| 5,995,100 A | 11/1999 | Auslander | | |
| 5,995,754 A * | 11/1999 | Holzle et al. | .................. | 717/158 |
| 6,067,575 A | 5/2000 | McManis et al. | | |
| 6,070,239 A | 5/2000 | McManis | | |
| 6,321,377 B1 * | 11/2001 | Beadle et al. | ................. | 717/148 |
| 6,370,687 B1 * | 4/2002 | Shimura | ....................... | 717/146 |
| 6,453,319 B1 | 9/2002 | Mattis et al. | | |
| 6,976,248 B2 * | 12/2005 | Balassanian | .................. | 717/148 |
| 7,178,142 B2 | 2/2007 | Bennett et al. | | |
| 7,225,430 B2 | 5/2007 | Eatough et al. | | |
| 7,266,244 B2 | 9/2007 | Mihcak et al. | | |
| 7,426,721 B1 | 9/2008 | Saulpaugh et al. | | |
| 7,506,310 B2 | 3/2009 | Gilbert | | |
| 7,577,754 B2 | 8/2009 | Garcia-Luna-Aceves et al. | | |
| 7,650,599 B2 * | 1/2010 | Smith et al. | .................... | 717/146 |
| 7,958,499 B2 * | 6/2011 | Doi et al. | ....................... | 717/148 |
| 2002/0026511 A1 | 2/2002 | Garcia-Luna-Aceves et al. | | |
| 2002/0100038 A1 * | 7/2002 | Balassanian | .................. | 717/177 |
| 2002/0107835 A1 | 8/2002 | Coram et al. | | |

(Continued)

*Primary Examiner* — Lewis A Bullock, Jr.
*Assistant Examiner* — Keith C Yuen
(74) *Attorney, Agent, or Firm* — Blakely, Sokoloff, Taylor & Zafman LLP

(57) ABSTRACT

A method and an apparatus that instructs a compiler server to build or otherwise obtain a compiled code corresponding to a compilation request received from an application are described. The compiler server may be configured to compile source codes for a plurality of independent applications, each running in a separate process, using a plurality of independent compilers, each running in a separate compiler process. A search may be performed in a cache for a compiled code that satisfies a compilation request received from an application. A reply message including the compiled code can be provided for the application, wherein the compiled code is compiled in direct response to the request, or is obtained from the cache if the search identifies in the cache the compiled code that satisfies the compilation request.

20 Claims, 13 Drawing Sheets

(56) References Cited

U.S. PATENT DOCUMENTS

| | | | |
|---|---|---|---|
| 2002/0147969 A1* | 10/2002 | Lethin et al. | 717/138 |
| 2003/0033593 A1 | 2/2003 | Duesterwald et al. | |
| 2003/0177480 A1 | 9/2003 | Arkwright et al. | |
| 2004/0148502 A1 | 7/2004 | Gollner et al. | |
| 2004/0167897 A1 | 8/2004 | Kuhlmann et al. | |
| 2004/0199516 A1 | 10/2004 | Thames et al. | |
| 2004/0225747 A1 | 11/2004 | Kadi | |
| 2005/0097535 A1 | 5/2005 | Plum | |
| 2005/0193196 A1 | 9/2005 | Huang et al. | |
| 2005/0246338 A1 | 11/2005 | Bird | |
| 2005/0273772 A1* | 12/2005 | Matsakis et al. | 717/136 |
| 2006/0048114 A1 | 3/2006 | Schmidt | |
| 2006/0130021 A1 | 6/2006 | Plum et al. | |
| 2006/0294498 A1* | 12/2006 | Partamian | 717/106 |
| 2007/0033659 A1 | 2/2007 | Hoche et al. | |
| 2007/0094648 A1* | 4/2007 | Post | 717/140 |
| 2007/0245323 A1 | 10/2007 | Bertelrud | |
| 2008/0098374 A1 | 4/2008 | Adl-tabatabai et al. | |
| 2008/0127142 A1* | 5/2008 | Wrighton et al. | 717/148 |
| 2008/0177989 A1 | 7/2008 | Mitran et al. | |
| 2008/0263529 A1 | 10/2008 | Beretta | |
| 2009/0055821 A1 | 2/2009 | Grcevski et al. | |
| 2009/0150685 A1 | 6/2009 | Matsushima et al. | |
| 2010/0095284 A1* | 4/2010 | Herring et al. | 717/148 |
| 2010/0115501 A1 | 5/2010 | Partridge et al. | |
| 2010/0313079 A1 | 12/2010 | Beretta et al. | |
| 2010/0313189 A1* | 12/2010 | Beretta et al. | 717/148 |

* cited by examiner

400

In response to receiving a compilation request from an application for compiling a source code, searching for compiled codes matching the compilation request (e.g. based on a representation of the source code) 401

Determining one or more compilers, each running in a separate process, to compile the source code if there is no cached compiled code matching the compilation request 403

Sending requests to identified compilers to compile the source code (e.g. via one or more request queues) 405

In response to receiving compiled codes for the source code from the identified compile, storing the compiled codes into the cache indexed according to the representation of the source code 407

Providing a reply to the application with the compiled codes stored in the cache 409

Selecting one or more JIT compilers to compile a source code for an application to execute during run time according to privilege and/or security settings (e.g. user identifier, usage privileges, etc.) of the application 1001

Generating a JIT compilation request including specifications indicating the selected JIT compilers for building an executable code from the source code, the specifications including privilege and/or security settings for the application 1003

Sending the JIT compilation request to a JIT compiler server to access (or retrieve) the executable code for the source code for execution 1005

Fig. 10

METHODS AND APPARATUSES FOR A COMPILER SERVER

FIELD OF INVENTION

The present invention relates generally to code compilation. More particularly, this invention relates to compilation of a source code for a run time application.

BACKGROUND

Running a source code (e.g. a script or a computer program in high level computer languages) during run time usually consumes too many processing cycles to be practically desirable. For example, graphics processing tasks often require making a large number of decisions in a state machine to process a single pixel. Even though multiple graphics libraries can be assembled together in the state machine, overall performance of graphics processing tasks can be severely degraded by the sheer number of possible branch possibilities involved. Typical attempt to reduce the number of branches to consider for performing graphics processing may include code optimization by compiling source codes, for example, using a JIT (Just in time) compiler.

However, traditional graphics compilers can be resource intensive, taking up a large amount of memory space and/or processor time. For example, typical code size for a compiler can be large. If an application links a library that uses a compiler, a virtual memory cost of a massive amount of compiler code may be imposed on the application, even if the compiler is never executed by the application. In addition, compilers tend to require large amount of private memory during run time (e.g. private memory hogs) because intermediate results may be cached for compilation performance. Thus, an application using a run time compiler, such as a JIT compiler, to generate compile codes may tax a significant part of the limited system resource.

Furthermore, compiled codes may not be shared for compilers implemented in shared libraries. For example, many applications requesting the same task may compile the same code in several process spaces, each for a separate application, without sharing. Additionally, applications may have to repeatedly compile the same source code for specific tasks during start up. Thus, application start up times can suffer.

Furthermore, many compilers are not designed with high robustness and tight security right from the start. Because running typical compilers allows an application to generate codes for execution, security holes may exist for malicious application codes to take advantage of. Usually, a shared security environment for running a compiler and a calling application tends to introduce security risks to each other. In addition, a compiler can be unstable (e.g. can crash unexpectedly). When calling a run time compiler, a calling application often crashes if the run time compiler crashes. As a result, a calling application may not have an opportunity to recover from a compiler failure.

Therefore, computing systems with applications running traditional run time compilers tend to be slow, unstable and insecure.

SUMMARY OF THE DESCRIPTION

An embodiment of the present invention can include methods and apparatuses that instruct a compiler to build a compiled code for a compilation request received from an application. The compiler may be configured to compile source codes for a plurality of independent applications, each running in a separate process. A search may be performed in a cache for a compiled code that satisfies a compilation request received from an application. A reply message including the compiled code from the cache can be provided for the application if the search identifies in the cache the compiled code that satisfies the compilation request.

In an alternative embodiment, a compiler can be identified to compile a source code for an application according to a compilation request received from the application. The identified compiler can be invoked into a memory if the identified compiler is determined not yet loaded. A separate process can be created for running the identified compiler. Subsequently, the compilation request can be sent to the process corresponding to the identified compiler to compile the source code.

In another alternative embodiment, a request to compile a source code into an executable code can be directed to a compiler server. The request can include a representation generated from the source code. The executable code can be retrieved from a compiler server according to the representation of the source code. If the retrieval of the executable code from the compiler server is successful, the executable code can executed for the source code. Otherwise, an interpreter can be invoked to interpret the source code.

Certain embodiments may use a software architecture in which multiple applications can, through an Application Programming Interface (API), make a call to a compiler server which can perform one or more of the methods described herein. For example, several applications can use the compiler server to manage a run time compilation process for each of the several applications. The management of run time compilation processes can include, for example, receiving run time compilation requests from each of the several applications, in response to receiving those requests searching a cache of compiled code (compiled from previous compilation requests by an application which may be one of the several applications) to determine whether a run time compilation process can be avoided by using compiled code in the cache which will satisfy the compilation request, invoking one or more compilers to create compiled code if the compiled code does not exist in the cache and adding the newly compiled code to the cache if it was determined from the searching to not exist in the cache. In certain implementations, a compiler server may not use a cache but the compiler server can service compilation requests from a plurality of applications and manage the compilation requests to invoke one or more compilers while protecting itself and the requesting applications from crashes by the one or more compilers. The requesting applications represent another embodiment of the innovation; these requesting applications call a compiler server to manage the run time compilation process.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 4 is a flow diagram illustrating one embodiment of a process to provide compiled codes for compilation requests;

FIG. 10 is a flow diagram illustrating one embodiment of a process to securely generate a compilation request for an application to compile a source code;

DETAILED DESCRIPTION

Figure 1A:
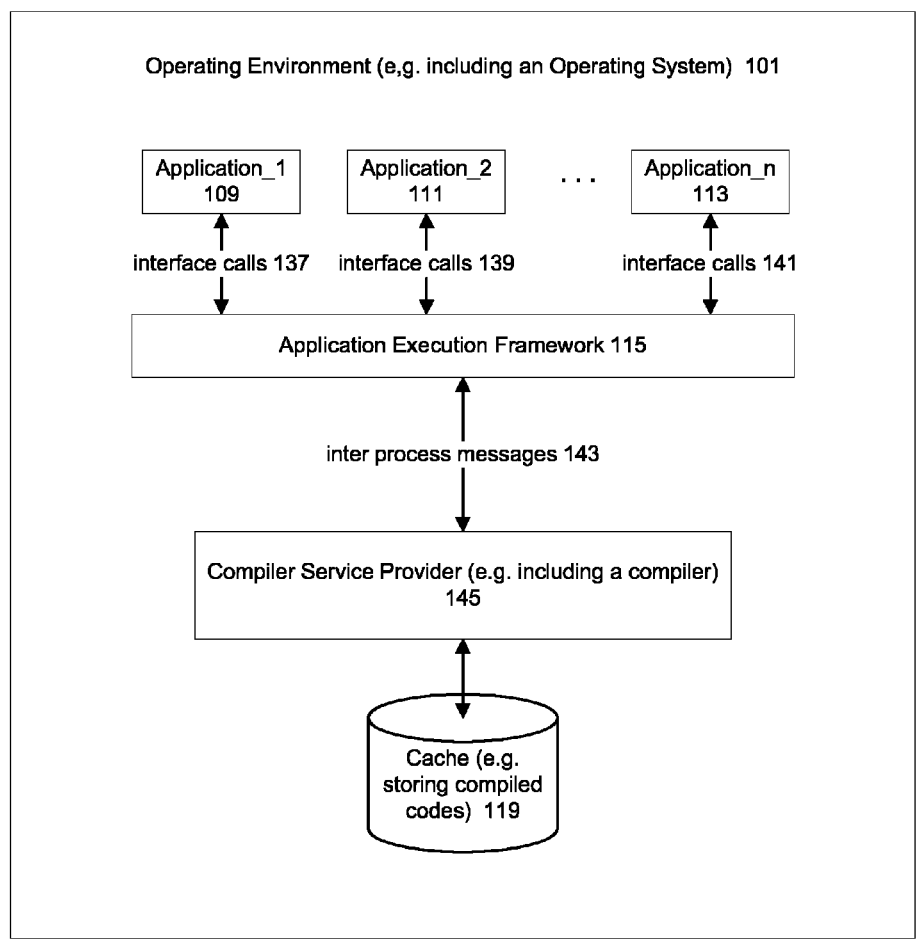
FIG. 1A is a block diagram illustrating one embodiment of a system providing compilation service.

Methods and apparatuses for a runtime compiler server are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

A compiler server (or a JIT compiler server) can service requests to compile and cache machine code for multiple independent application processes. Two processes may be independent if the status of one process (e.g. starting, idling, busy, exiting etc.) is not related to the status of the other process. In one embodiment, a compiler server can be a daemon process or a stand alone process separate from application processes. A compilation request that is passed to the compiler server can be formulated to uniquely describe a compilation task. In one embodiment, a compilation request includes a source code for a function. Alternatively, a compilation request can include a compact binary description of a compilation task to be decoded by a specialized compiler. The compiler server can load and manage several compilers which are running separately in their own different processes apart from the process running the compiler server.

A compiler server can reduce the per process memory penalty to perform compilation (e.g. JIT compilation) with OpenGL (Open Graphics Library) codes to a single instance. Additionally, a compiler server can enable caching of intermediate building block code. In one embodiment, multiple processes share common executable codes derived from the same source code, such as based on the same incoming state vectors to standardize best practices in using a compiler server. As a result, one or more application processes using a compiler server can allow more memory savings, better processing efficiency and increased number of optimization opportunities.

In one embodiment, a compiler running in its own process can be shared by multiple applications via a compiler server. Thus, an application can perform compilation without incurring memory (e.g. virtual memory) cost associated with a compiler in the application's own memory space. Private memory pages allocated by a compiler can also be shared by all users of a compiler server. As a consequence, intermediate results that are produced and cached on behalf of one application are useful to other applications using the compiler server.

If a compiler running in its own process crashes or corrupts itself, the particular compilation request from an application that causes the crash or corruption may not be serviced. The application can still continue running in the corresponding application process. For example, an application using OpenGL for JIT compilation can simply continue execution non-compiled code when the compiler performing the JIT compilation crashes. In some embodiments, a compiler server includes an illegal (or invalid, bogus) code detection mechanism to guard against returning an illegal code generated by a compiler to an application.

In one embodiment, a compiler server can be invoked when a first process needing it tries to compile a code (e.g. JIT compilation), such as when during system start up. A compiler server can be shutdown when the need for compilation ends with some nominal delay (e.g. to avoid start up thrashing). At start up, a compiler server can be initialized to allocate memory (e.g. about 300K) for compiler instantiation. Each process (e.g. application process) can use the same compiler server without incurring initialization penalty for compiling codes (e.g. a memory saving of about 300 KB per process). Since a single instance of compiler server is needed across an OS, the cost of the compiler server can be minimal.

A compiler server can cache result data generated by a compiler with respect to the data that was used to describe the corresponding compilation request. If another application makes the same compilation request, the compiler server can service the application with the same result data previously generated. In one embodiment, the result data is in read-only shared memory such that each application can access shared memory (e.g. virtual memory) pages pointing to the same single copy of the result data. Cache content for the compiler generated data can be stored in non-volatile storage so that it is available on system start up to service requests that have been made before according to cache design heuristics.

According to one embodiment, the processing time savings in caching the intermediate results and final executable codes can be spread over multiple application processes using a common compiler server (e.g. via OpenGL or higher level APIs). A global intermediate and code caching scheme can be included in a compiler server. Code generation can be sped up via caching compiler intermediate code when like building blocks are used while ensuring the cache is purged when additional memory is needed by the system. Cache sharing can be allowed across multiple processes which will likely use many of the same code building blocks. For example, similar high level APIs invoked in different processes using common use patterns for OpenGL can generate much the same OpenGL code generation requests. Code and building block caching could result in performance improvements and reduced system load, for example, when applications are rapidly changing OpenGL state.

In some embodiments, caching generated executable codes can avoid compilation to reduce overall system work load by matching full standard OpenGL state patterns across multiple processes. By establishing a common compiler server to service compilation needs for more and more library components (e.g. via JAVA®, OpenCL-Open Computing Language, OpenGL etc), a standard can be set across the OS to ensure common practices in the use, caching and reuse of compiler building blocks as well as generated codes.

In one embodiment, a compiler server can enable predicative compilation (e.g. JIT compilation) based on user historical use patterns or known critical state vectors (such as web page cache). For example, lightweight state vectors, such as common OpenGL states, can be pre-compiled and saved as executable code via low priority background process on system startup, thus reducing the instantaneous need for JIT compilation during run time. When detecting a new state vector (or unmatched state hash), an application (e.g. via OpenGL) can build a basic function code block queued for generating an optimized compiled code block. A compiler server can allow the application to access the optimized compiled code block for the state vector on the second and subsequent executions of the application process.

In certain embodiments, predictive caching based on a compiler server can improve launch time requirement for an application. For example, an application's small and known state vectors can be pre-cached with compiled codes prior to the start of the application (or application process). When the application starts, a code signature generated by the application can match a hash in a cache to fetch the pre-cached compiled codes, thus avoiding creating compiler instances.

In one embodiment, a compiler server can be designed to provide run time compilation services between multiple applications and compilation processes. Compiled codes can be cached to be reused by a single application or shared across different applications. A compiled code can be relocatable into different process address spaces. A compiler can run in a single process to serve multiple applications (or application processes). Each compiler can run in its own process when invoked (e.g. by an operation system). A process can have its own resources and memory (or address) space shared by threads in the same process. Typically, multiple processes can simultaneously run in a system independent of each other. An abnormal exit of a process may not affect a running status of another process. However, an abnormal behavior of a thread of a process may often crash the process owning the thread. Thus, a compiler server can provide a framework to separate compiler processes from application processes. Additionally, when compilation failures occur, the compiler server can inform an application to adopt alternative paths for compilation. Multiple compilers can be allowed to serve one single application concurrently via the framework.

According to one embodiment, a compiler server can remove the burden of hand tuning library codes targeting different processor architectures to reduce maintenance overhead for optimizing the library codes. For example, graphics package may be shipped including library source codes for corresponding library components to allow application processes requesting a compiler server to compile application source codes with the library source codes to automatically update library components during run time. The compiler server can identify outdated library components (or library codes) to replace them with newly compiled library codes automatically while servicing compilation requests for applications without user intervention.

In some embodiments, a compiler server enables an application to retrieve a compiled code for execution during run time without incurring compiler startup cost (e.g. start up time for invoking a compiler). Usually, a single start up time is needed for a compiler (e.g. a run time compiler) to serve multiple applications. When expanding the service of a compiler server over a networked environment, such as running JAVA® JIT in a backend server system, a single start up cost of a compiler can be shared among multiple applications across multiple computing devices coupled over a network.

According to one embodiment, a compiler server can add multiple layers of security guards to prevent malicious attacks on potential system weakness. For example, permissions associated with compiled executable codes can limit access or sharing for applications or clients with certain security credentials (or settings) to ensure secure run time execution. Applications (or application processes) may be prohibited from generating executable codes to execute directly. Compiler processes can be tightly controlled by a single and robust compiler server for generating secure executable codes. Furthermore, security can be enhanced by running a compiler as a server in a security environment that differs from a calling application. Thus, the compiler server can add additional security protections for critical system resources such as cellular network, base band components, or system settings without compromising code generation.

In one embodiment, a compiler server enables high level tools used in applications to generate optimized codes instead of stitching together small pieces of compiled codes. For example, a user can perform a number of tasks (e.g. each task being based on a different source code) to automatically create a customized cache library with specific support for these tasks. Each cached code can include an optimized combination of compiled codes from different pre configured libraries, such as CoreUI, OpenCL (Open Computing Language), OpenGL (Open Graphics Library), etc. Additionally, the compiler server can automatically update a customized cache library from one release of a system and/or pre configured libraries to another. As a result, a cache library supporting common user tasks can be built through usage scenarios via a compiler server for better code reuse and code sharing for improving overall system performance (e.g. shortened response time).

FIG. 1A is a block diagram illustrating one embodiment of a system providing compilation service. In one embodiment, system 100A can be a computer operating environment including an operating system and/or runtime client applications 109, 111, . . . 113, which can run in separate processes concurrently. In one embodiment, an application process running an application linked with an application execution framework 115 to perform data processing tasks according to a source code of the application. An application 109, 111 . . . 113 can make interface calls (e.g. via APIs) 137, 139 . . . 141 including a source code to an application execution framework 115 for execution. In one embodiment, the application execution framework 115 sends a compilation request to a compiler service provider 145 to compile a source code for execution. The compiler service provider 145 can include one or more compiler processes separate from application processes running applications 109, 111 . . . 113. A compiler in the compiler service provider 145 can be configured to compile source codes from a plurality of independent client applications. For example, a single compiler service provider 145 can serve compiled codes for compilation needs (e.g. for JIT compilation) from multiple applications 109, 111 . . . 113 during run time.

In one embodiment, an application 109, 111 . . . 113 causes an inter process communication message 143 including a compilation request to be forwarded from an application framework 115 to a compiler service provider 145. A compiler service provider 145 can include a compiler (e.g. running in its own process) to compile source codes for multiple applications 109, 111, . . . 113. In some embodiments, the compiler service provider 145 is associated with a cache 119 storing previously compiled codes. The compiler service provider 145 can return a compiled code corresponding to a source code for an application 109, 111 . . . 113 via an application execution framework 115 based on inter process communication messages. In some embodiments, the compiler service provider 145 returns a previously compiled code retrieved from a cache 119 for a compilation request. A compiled code returned to an application 109 111 . . . 113 from a cache 119 can be previously compiled by the same or a different application. The compiler service provider 145 can store newly compiled codes into the cache 119 for future retrieval.

Figure 1B:
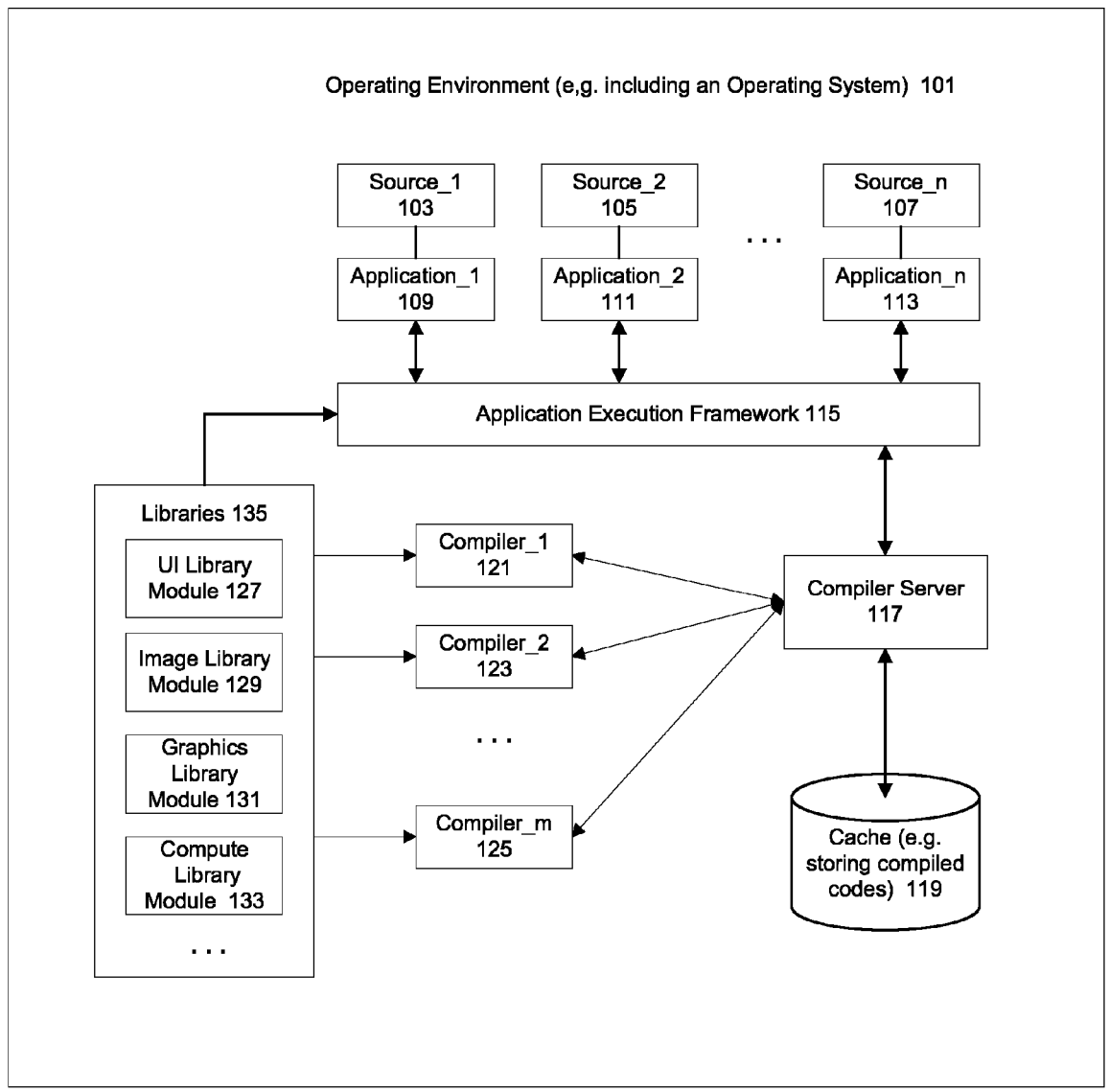
FIG. 1B is a block diagram illustrating one embodiment of a system providing compilation service via a compiler server.

FIG. 1B is a block diagram illustrating one embodiment of a system providing compilation service via a compiler server. In one embodiment, system 100 can be a computer operating environment including an operating system and/or runtime client applications 109, 111, . . . 113. Running a client application can include executing an associated source code, such as source_1 103, source_2 105 and/or source_n 107 for application_1 109, application_2 111 and/or application_n 113 respectively. In one embodiment, a source code is a computer program written in high level programming languages, such as C, C++, Perl, JAVA® or other languages. Typically, a computer program includes multiple lines of codes for implementing a data processing task. An application can pass a source code to an operating environment for execution (e.g. performing instructions according to the source code). In one embodiment, applications 109, 111, 113 execute associated source codes 103, 105, 107 via an application execution framework 115. Applications 109, 111, 113 can be independent client applications, each running in a separate process.

An application execution framework 115 can determine how a source code is executed. For example, the application execution framework 115 can identify or select from libraries 135 relevant library codes referenced directly or indirectly in a source code for execution. The application framework 115 can interpret the source code, such as executing the source code directly, translating the source code to an intermediate representation for immediate execution, and/or explicitly executing stored precompiled codes from the libraries 135 corresponding to the source code. Alternatively, the application framework 115 can cause a source code to be compiled for execution during run time (e.g. JIT compilation). Compiled code built (or compiled) from source code can be optimized for execution (e.g. according to target processor architecture or to reduce the number of branching instructions). Processor architecture may indicate a 32-bit processor, a 64-bit processor, different families of processors from a manufacturer or other processor type identifiers. In some embodiments, multiple compiled codes based on a variety of compilation options (e.g. target architectures, library selections, compilation optimization levels, security settings, and/ or other compilation flags etc.) are available from a single source code. The application execution framework 115 can steer compilation of a source code or select a compiled code for the source code to execute based on instructions from an associated application.

In one embodiment, a process running an application generates a compilation request (or JIT compilation request) via an execution framework 115 for a compiler server 117 to compile a source code. The compiler server 117 can be a separate process running in an operating environment 101. In one embodiment, a compiler server runs in a separate device coupled via a network connection with the device hosting the application generating the compilation request. A compiler server 117 can constantly monitor (e.g. listen to incoming connections) for compilation requests from processes running applications to serve corresponding compiled codes (or service compilation requests). An application process (or the process running the application) can wait for a compiler server 117 to return the corresponding compiled code built from a source code for execution during run time.

In one embodiment, a compiler server 117 determines which compilers to use to build a compiled code for a source code according to a compilation request received from an application process. A compilation request can include options specifying which compiler or compilers, e.g. based on target processor architectures, library preferences, levels of compiler optimizations, and/or other compilation flags etc., to compile an associated source code. In one embodiment, a compiler server 117 is configured with a collection of compilers available to perform compilation (or JIT compilation). Each compiler process, such as compiler_1 121, compiler_2 123, or compiler_m 125, can run a separate compiler. The compiler server can dynamically allocate memory and load additional compilers when the need arises (e.g. based on the number of compilation requests received from multiple running applications per unit of time). When detecting a low compilation need (e.g. based on the number of idle compilers and/or the durations each idle compiling has been idle), the compiler server can unload (or killing off) compilers (or compiler processes) to free system resources (e.g. available memory). Libraries 135 can include preinstalled modules referenced directly or indirectly by compilers during compilation, such as, for example, a UI library module 127 for user interface routines, an image library module 129 for high level image processing routines, a graphics library module 131 for low level graphics process routines, and a compute library module 133 for computing routing using a graphics processor etc.

In one embodiment, a compiler process compiles a source code on a request from a compiler server 117. A compiler process running a compiler can be invoked during system start up. In one embodiment, a compiler server 117 invokes a compiler process running (or loads into a memory) a particular compiler when needed. A compiler server 117 can unload a compiler (or revoking a compiler process running the compiler), thus releases memory space occupied by the compiler. In one embodiment, a single compiler process performs compilation for multiple application processes sequentially according to an order of requests received from a compiler server 117. Building a compiled code for a source code may include multiple compiler processes communicating with each other directly or indirectly via a compiler server 117. For example, a compiler process can notify the compiler server 117 to request a linker process to build a compiled code (or executable code) by linking multiple parts of the compiled code.

In one embodiment, a cache 119 is coupled with a compiler server 117 to store compiled codes. The cache 119 can be a storage allocated in memory. In one embodiment, the cache 119 is allocated in an individual storage device (e.g. a mass storage device) locally attached or remotely coupled via network connections to the device running a compiler server 117. In one embodiment, the compiler server 117 can search the attached cache 119 for a compilation request received from an application process. In one embodiment, a compilation request includes a representation of a source code, such as a hash key generated from the text of the source code). In some embodiments, the compiler server 117 generates a representation for the source code associated with a compilation request. The compiler server 117 may store a compiled code built from a source code in the cache 119 according to a representation of the source code. Typically, representations of source codes can allow the compiler server 117 to perform an efficient search in the cache 119 to retrieve existing compiled codes matching a compilation request from an application process to reuse previous compilation results.

Figure 2:
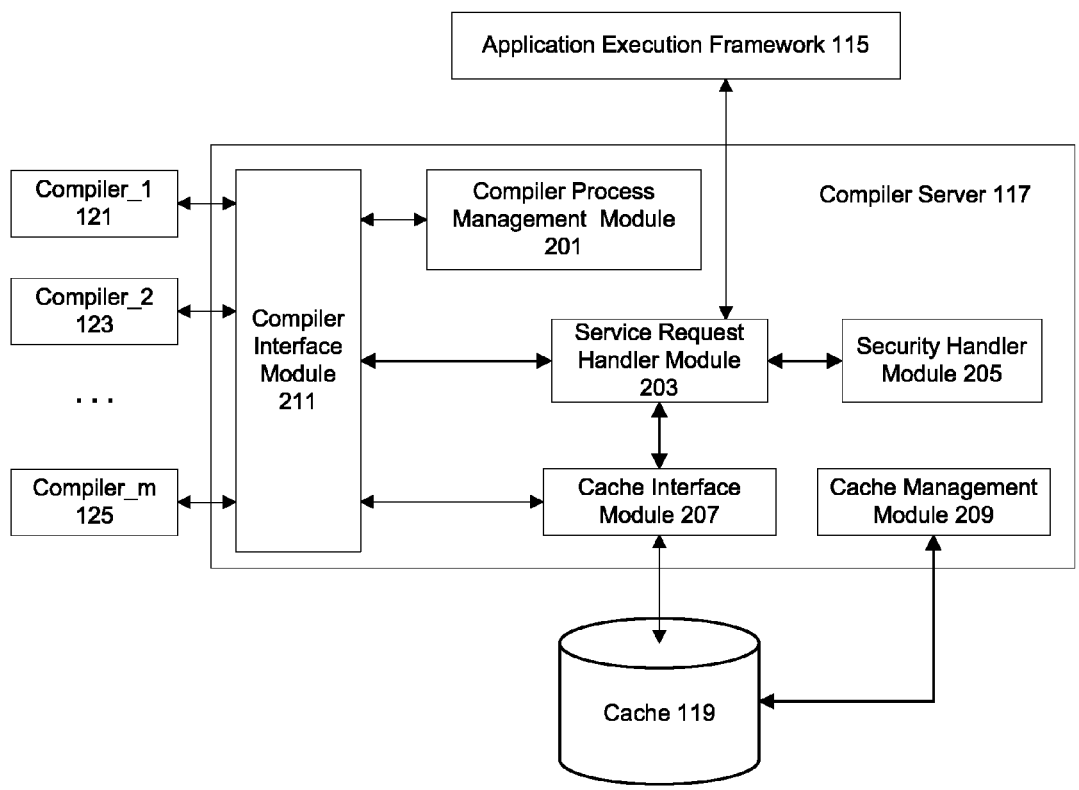
FIG. 2 is a block diagram illustrating one embodiment of a system for a compiler server.

FIG. 2 is a block diagram illustrating one embodiment of a system for a compiler server. For example, system 200 can include a compiler server 117 as part of system 100 of FIG. 1B. In one embodiment, an application process interfaces with the compiler server 117 via an application execution framework 115 to send a compilation request and receive corresponding compiled codes. The compiler server 117 can include a service request handler module 203 to process compilation requests received from application processes. The service request handler module 203 can extract a representation of a source code associated with a received compilation request to compile the source code. In some embodiments, the service request handler module 203 generates a representation from a source code associated with a compilation request. The service request handler module 203 can extract compilation specifications (or settings), such as security settings, authorization levels, user information, target architectures (e.g. processor architecture), optimization levels, compiler preferences, version constraints, and/or other compilation options etc., from a compilation request.

In one embodiment, a service request handler module 203 retrieves an existing (or cached) compiled code for a compilation request via a cache interface module 207. In one embodiment, a cached compiled code previously compiled according to a previous compilation request is retrieved according to a representation of the source code. In some cases, there may be more than one compiled codes stored in the cache corresponding to a single source code (or program). For example, two different compiled codes for a source code may be cached to support both 32 bit and 64 bit processor architectures. Each cached compiled code compiled from a single source code can be indexed under the same representation (or key) for the corresponding source code. In one embodiment, a compiled code can be cached with associated meta data specifying, for example, compilation options and/or security settings (e.g. security level, user information, compiler information etc.). The service handler module 203 or cache interface module 207 can determine whether a retrieved compiled code satisfies compilation specifications extracted from a compilation request according to associated meta data.

In one embodiment, a security handler module 205 determines whether a compilation request satisfies security constraints associated with a compiled code. The security handler module 205 can evaluate a security constraint by comparing compilation specifications extracted from a compilation request and meta data associated with a compiled code. If a security constraint is violated between a compilation request and a compiled code, the security hander module 205 can notify the service request handler module 203 to filter a cached compiled code from being returned to an application process making the compilation request.

In one embodiment, a service request handler module 203 requests compiler processes, such as compiler_1 121, compiler_2 123, and/or compiler_m 125, to perform compilations (e.g. JIT compilation) to build a compiled code from a source code associated with a compilation request via a compiler interface module 211. Typically, a compiler compiles a source code if a corresponding compiled code is not available, for example, when no cached compiled codes match a representation of the source code or when cached compiled codes fail to satisfy security requirements or compilation specifications. In one embodiment, the service request handler module 203 can identify one or more compilers 121-125 to compile a source code based on specifications of a compilation request (e.g. preferences). A compiler can be associated with security attributes, e.g. whether it is secure or insecure. A secure compiler can generate executable codes which do not corrupt when executed regardless of input variations. A security handler module 205 can filter or disqualify a compiler from being selected for a compilation request if the compiler's security attributes do not match specifications (e.g. security settings) of the compilation request.

A compiler interface module 211 can schedule compilations for the identified compilers, such as compiler_1 121, compiler_2 123, and/or compiler_m 125, each running in a separate compiler process. If an identified compiler is busy compiling other codes, the compiler interface module 211 can update a queue associated with the identified compiler for scheduling a compilation task for the source code. On the other hand, if an identified compiler is not yet loaded, the compiler interface module 211 can invoke a compiler process to run the identified compiler (or load the compiler), for example, via a compiler process management module 201. When a compiled code is successfully built, the compiler interface module 211 can forward the compiled code to a cache interface module 207 for caching. The compiler interface module 211 can return an error message indicating failure of a particular compiler to the service request handler module 203.

In one embodiment, a compiler process management module 201 provides status information for a number of available compilers, such as whether a compiler is loaded, a resource usage data of a loaded compiler, and/or whether a loaded compiler stalls, etc. The compiler process management module 201 can load a compiler and/or unload a compiler. In one embodiment, the compiler process management module selects which compiler processes to revoke for loading compilers requested from the compiler interface module 211. The compiler process management module can instantiate (or load) a default collection of compilers during start-up time of an operating system, such as system 101 of FIG. 1B.

In one embodiment, a cache interface module 207 accesses a cache 119 to store already compiled codes and retrieve cached compiled codes. The cache interface module 207 can retrieve previously compiled codes from the cache 119 based on a representation of a source code corresponding to the compiled code. In one embodiment, the cache interface module 207 receives a representation of a source code from a service request handler module 203 to retrieve a compiled code. Alternatively, the cache interface module 207 can generate a representation from a source code. When a newly compiled code is ready, e.g. from a compiler interface module 211, the cache interface module 207 can generate meta data to store into the cache 119 with the newly compiled code according to specifications extracted from a corresponding compilation request. A compiled code stored in the cache 119 can be searchable based on a representation of a source code corresponding to the compiled code. In one embodiment, a cache management module 209 periodically removes a portion of cached compiled codes to make room for newly compiled codes. The cache management module 209 may determine which compiled codes to remove based on usage frequencies, ages, sizes, and/or meta data (e.g. compiler versions) etc.

Figure 3:
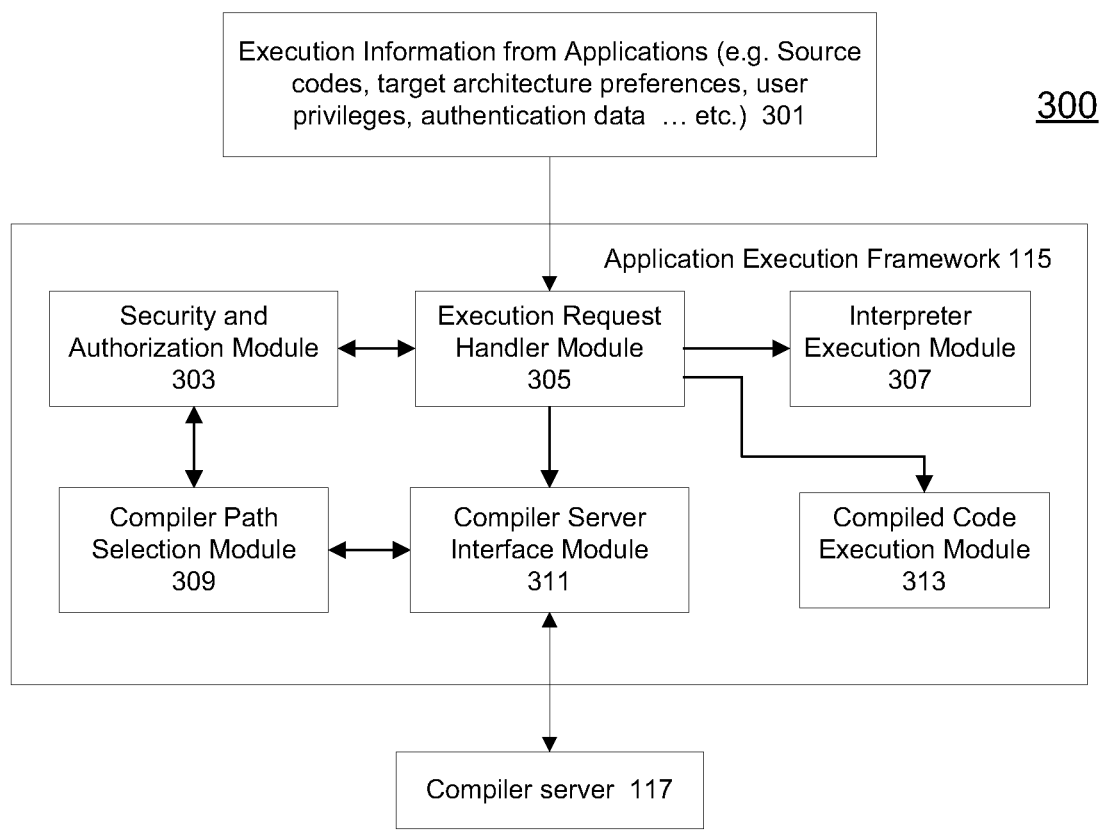
FIG. 3 is a block diagram illustrating one embodiment of an interface system between an application and compiler server.

FIG. 3 is a block diagram illustrating one embodiment of an interface system between an application and compiler server. For example, system 300 can include an application execution framework 115 as part of system 100 of FIG. 1B. In one embodiment, the application execution framework 115 runs in an application process, such as application_1 109, application_2 111 or application_n 113 of FIG. 1B. In an alternative embodiment, the application execution framework can run independently of application processes 109-113, intercepting compilation requests from application processes 109-113. An application can specify execution information 301 for the application framework 115 to execute a source code. Execution information can include, for example, a pointer to a source code (or program) to execute, target processor architectures, user privileges associated with the application, and/or authentication information etc. User privileges can indicate a level of security allowance for a user of the application. In one embodiment, authentication data can identify a user of the application to execute the source code.

An application execution framework 115 can include an execution request handler module 305 to determine whether to execute a source code via an interpreter or to optimize the source code for execution via a compiler (e.g. JIT compiler). In one embodiment, an application process running an application linked with the application execution framework 115. The execution request handler module 305 can be associated with APIs (application programming interfaces) called from an application with execution information to request executing a source code. In some embodiments, a security and authorization module 303 determines whether a user is entitled to execute a compiled code corresponding to a source code. Typically, by default, the execution request handler module 305 can request a compiled code compiled from a source code for execution via a compiler server interface module 311. If no compiled code is available, the execution request handler module 305 can interpret the source code via an interpreter execution module 307. In one embodiment, the execution request handler module 305 determines a compiled code is not available if the compiler server interface module 311 does not return a compiled code for execution within a certain period of time. If a compiled code is available, the execution request handler module 305 can execute the compiled code via a compiled code execution module 313.

Alternatively, the interpreter execution module 307 can interpret the source code immediately while a request is dispatched to the compiler server interface module 311 for a compiled version of the source code. When the compiled version becomes available, for example, the execution request handler module 305 can switch over from the interpreter execution module 307 to execute the compiled code via the compiled code execution module 313. An application framework 115 can choose to compile a source code and simultaneously choose to interpret the source code until the compilation is complete, e.g. using a different execution unit. In one embodiment, the application framework 115 silently switches from an interpreter to an optimized compiled code when completion is complete. Thus, an application using the application framework 115 can be enabled to make progress on (and possibly complete) a task that requires a compiled code before the compiled code is actually available.

In one embodiment, a compiler server interface module 311 generates a compilation request for a compiler server 117 to return a compiled code corresponding to a source code. A compilation request can include execution information from an application to compile a source code. A compiler path selection module 309 can select which among available compilers to compile a source code. The compiler server interface module 311 can insert compiler selection information from the compiler path selection module 309 into to a compilation request. In one embodiment, the compiler path selection module 309 relies on a security and authorization module 303 to filter out compilers not allowed to compile a source code for an application according to the execution information. When receiving from the compiler server 117 an error message indicating failure in a particular compiler to compile a source code, the compiler server interface module 311 can direct the compiler selection module 309 to select an alternative set of compilers to compile the source code. The compiler server interface module 311 can indicate to the execution request handler module 305 whether a compiled code is available for a source code.

FIG. 4 is a flow diagram illustrating one embodiment of a process to provide compiled codes for compilation requests. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1B. In one embodiment, at block 401, the processing logic of process 400 performs a search in a storage, such as cache 119 of FIG. 1, for existing compiled codes previously compiled from a source code. The processing logic of process 400 can receive a compilation request to compile a source code. Compiled codes can be stored in the storage as indexed according to representations of corresponding source codes. A representation of a source code can be a compressed version of, or a hash key generated from, a text of the source code, for example, based on MD5 (Message Digest algorithm 5), SHA256 (Secure Hash Algorithm 256 bits) or other algorithms. Typically, representations can be shortened identifiers uniquely associated with corresponding source codes. A compilation request to compile a source code can include a representation of the source code. Alternatively, the processing logic of process 400 can generate a representation of a source code indicated in a compilation request.

In one embodiment, the processing logic of process 400 identifies one or more compile codes from a cache (or storage) based on a representation of a source code, each identified compiled code being compiled from the same source code using different compilers, and/or based on different compilation options etc. The processing logic of process 400 can determine if an identified compiled code is compatible with the corresponding compilation request. For example, a compiled code can be cached together with meta data indicating a target processor and the compilation request can include specifications to compile the source code for a particular target processor. The processing logic of process 400 can determine if the identified compiled code is compatible with the compilation request based on whether the target processor indicated in the meta data is consistent with the target processor specified in the compilation request. A set of rules (e.g. pre configured) can govern consistency between different types or versions of processors.

If there is no cached compiled code matching a compilation request, the processing logic of process 400 can determine (or identify) one or more compilers to perform compilation on a source code for the compilation request at block 403. Each compiler can run in a separate process by itself. In one embodiment, the processing logic of process 400 performs the selection from a group of available compilers according to specifications included in the compilation request. For example, a compilation request can include specifications indicating a preference for OpenGL compiler using a user interface library (e.g. Core_UI library). In case a compiler explicitly specified in a compilation request is not available and/or if the application process associated with the compilation request is not allowed to access such a compiler, the processing logic of process 400 can determine an alternative compiler compatible with the specifications of the compilation request. In some embodiments, the processing logic of process 400 considers optimization levels, system resource usage status, and/or application process priority to select compilers for a compilation request. If a compiler to perform compilation for a compilation request is not yet loaded, the processing logic of process 400 can invoke a new process running the compiler.

At block 405, in one embodiment, the processing logic of process 400 sends requests to identified compilers (e.g. processors running JIT compilers) to compile a source code. Each compiler can be running in a separate process to perform compilations for multiple compilation requests from different application processes. A new request for compilation can be placed in (or appended to) a queue for a single compilation process to access to build a compiled code for each request in the order as queued. In one embodiment, each compiler process is associated with a separate request queue that stores received requests from a compiler server.

In response to receiving a compiled code from a compiler, at block 407, the processing logic of process 400 stores the received compiled code into a cache for possible sharing among different applications. A compiled code can be indexed in the cache according to a representation of a corresponding source code. In one embodiment, the processing logic of process 400 generates additional information describing the compiled code as meta data to be cached together with the compiled code. Meta data can include descriptions of the compiler (or compilers) compiling the compiled code, a time stamp, an identifier of a user of the application process which initiates the first compilation request for the compiled code, target processor architectures to execute the compiled codes, and/or other relevant specifications. At block 409, the processing logic of process 400 can return the compiled code as stored in the cache back to an application process originating the compilation request for the compiled code.

Figure 5:
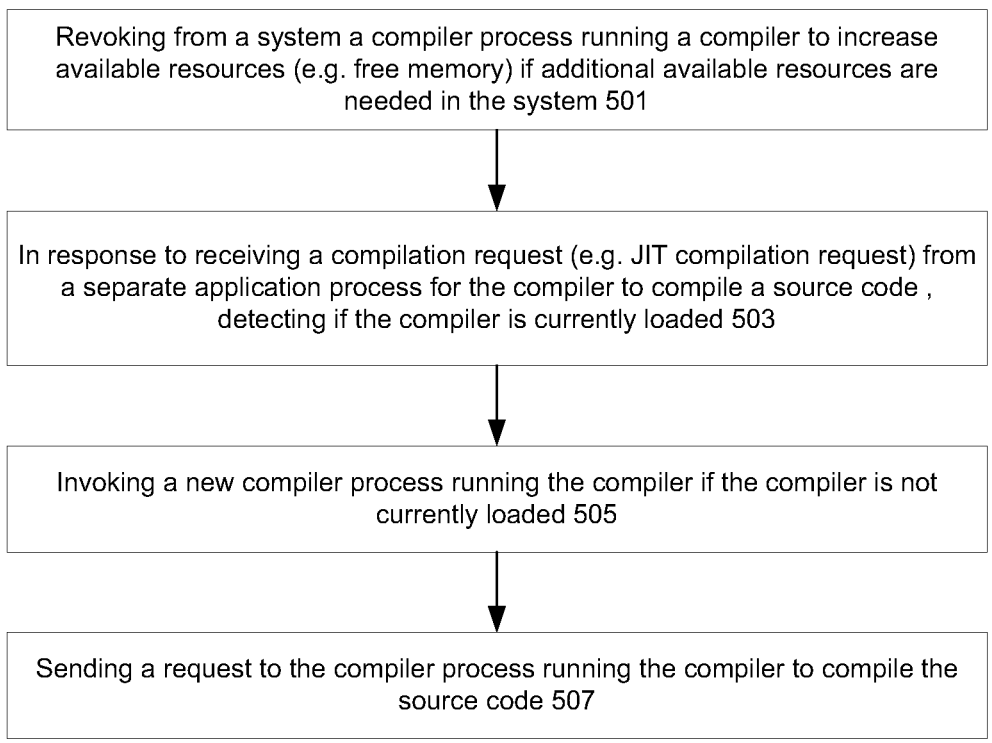
FIG. 5 is a flow diagram illustrating one embodiment of a process to invoke a process to run a compiler for a compilation request.

FIG. 5 is a flow diagram illustrating one embodiment of a process to invoke a process to run a compiler for a compilation request. Exemplary process 500 may be performed by a processing logic that may comprise hardware, software, or a combination of both. For example, process 500 may be performed by some components of system 100 of FIG. 1B. In one embodiment, at block 501, the processing logic of process 500 revokes from a system a compiler process running a compiler, such as compiler_1 121, compiler_2 123 or compiler_m 125 of FIG. 1, to increase available resources if additional available resources are needed. Multiple compiler processes can be running concurrently in a system, each compiler process corresponding uniquely to a separate compiler. In one embodiment, the processing logic of process 500 inspects statuses of current compiler processes periodically or on demands (e.g. based on requests from an operating system). A status of a compiler process can include amount of resources consumed, a number of compilation tasks to complete (e.g. waiting in a queue), and/or how long the process has been idling, etc. The processing logic of process 500 can determine to revoke one or more compiler processes for increasing available resources by comparing statuses of running compiler processes with an overall system resource usage (e.g. for the whole device hosting the system).

In one embodiment, at block 503, the processing logic of process 500 detects whether a compiler, e.g. a JIT compiler, is currently loaded to compile a source code in response to receiving a compilation request, from a separate application process. Typically, during run time, an application process can issue a compilation request to compile a source code by a JIT compiler. To optimize system resource usage or to accommodate limited system resource, some available compilers may not be loaded into a system all the time. A compiler can be loaded into the system (or a memory of the system) when a compiler process running the compiler has been invoked. In one embodiment, the processing logic of process 500 maintains a run time record indicating whether a compiler is currently loaded or not, which compiler process is associated with a compiler if loaded, an estimated resource usage to load a compiler, and/or other relevant run time information. The processing logic of process 500 can detect whether a compiler is loaded according to the run time record maintained. In one embodiment, a compiler process runs one single loaded compile at a time. Alternatively, a compiler process can run different compilers at different times.

If a compiler to compile a source code is not currently loaded, the processing logic of process 500 can invoke a new compiler process to run the compiler at block 505. In one embodiment, the processing logic of process 500 determines whether one or more currently running compiler processes should be revoked to make room for the new compiler process, for example, based on current statuses of running compiler processes and resource usage estimation for the compiler maintained in a run time record. If there is no compiler process to revoke (e.g. each is busy compiling codes) to make room for the new compiler process, the processing logic of process 500 can wait for certain period of time (e.g. preset period of time) to make another attempt to load the compiler until the compiler is successfully loaded. In some embodiments, the processing logic of process 600 invokes a new compiler process to run the compiler if there are remaining compilation requests queued in a request queue associated with the compiler when the compiler is not currently loaded (e.g. when a previous compiler process running the compiler crashed). Subsequently at block 507, the processing logic of process 500 can send a request to the compiler process running the compiler to compile the source code.

Figure 6:
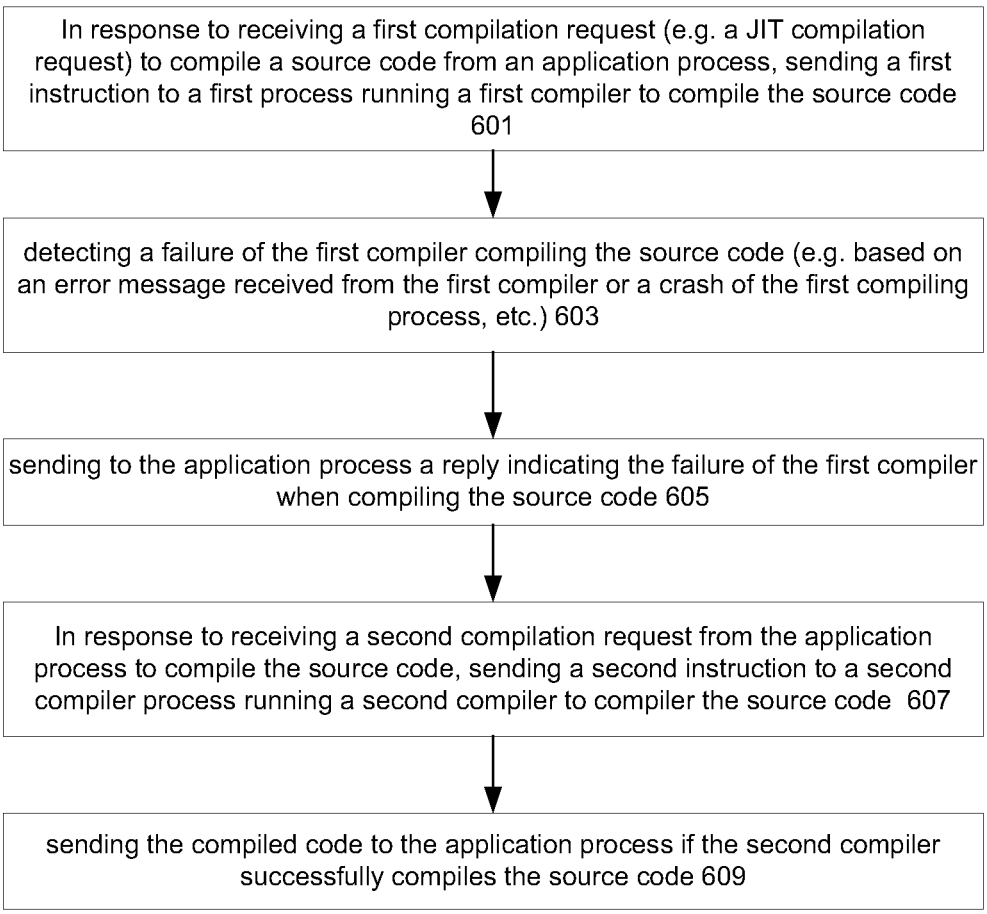
FIG. 6 is a flow diagram illustrating one embodiment of a process for handling compilation error.

FIG. 6 is a flow diagram illustrating one embodiment of a process for handling compilation error. Exemplary process 600 may be performed by a processing logic that may comprise hardware, software, or a combination of both. For example, process 600 may be performed by some components of system 200 of FIG. 2. In one embodiment, at block 601, the processing logic of process 600 sends a first instruction to a first process running a first compiler, such as compiler_1 121, compiler_2 123 or compiler_m 125 of FIG. 1, to compile a source code in response to a first compilation request received from an application process to compile a source code, such as source_1 103 of application_1 109, sourc_2 105 of application_2 111 or source_n 107 of application_n 113 of FIG. 1B. The processing logic of process 600 can generate the first instruction including compilation options, such as library paths (or names) and/or other compilation options, from the first compilation request. The first compilation request and the first instruction can be inter process messages communicated between separate processes within a system or between different systems.

At block 603, the processing logic of process 600 can detect a failure from a first compiler process running a first compiler compiling a source code. The first compiler can send an error message indicating an error has occurred from compiling the source code or related to a first instruction to compile the source code. In some embodiments, the processing logic of process 600 detects the first compiler process running the first compiler has exited (e.g. crashed or been revoked etc.) according to a notification from a system service or based on a system status. The processing logic of process 600 can access a request queue associated with the first compiler to determine whether the first compiler has been unloaded while compiling the source code. In the event that the first compiler fails while compiling a source code for an application process, at block 605, the processing logic of process 600 can send a reply to the application process to indicate such a failure.

Subsequently at block 607, the processing logic of process 600 can receive a second compilation request from the application process to compile the source code again. The second compilation request can specify a second compiler alternative to the first compiler to compile the source code. In response, the processing logic of process 600 can send a second instruction to a second compiler process running a second compiler to compile the source code as specified in the second compilation request. If the second compiler successfully compiles the source code into a compiled code, at block 609, the processing logic of process 600 can return the compiled code to the application process. The processing logic of process 600 can cache the compiled code into a cache (or storage) such as cache 119 of FIG. 1B.

Figure 7:
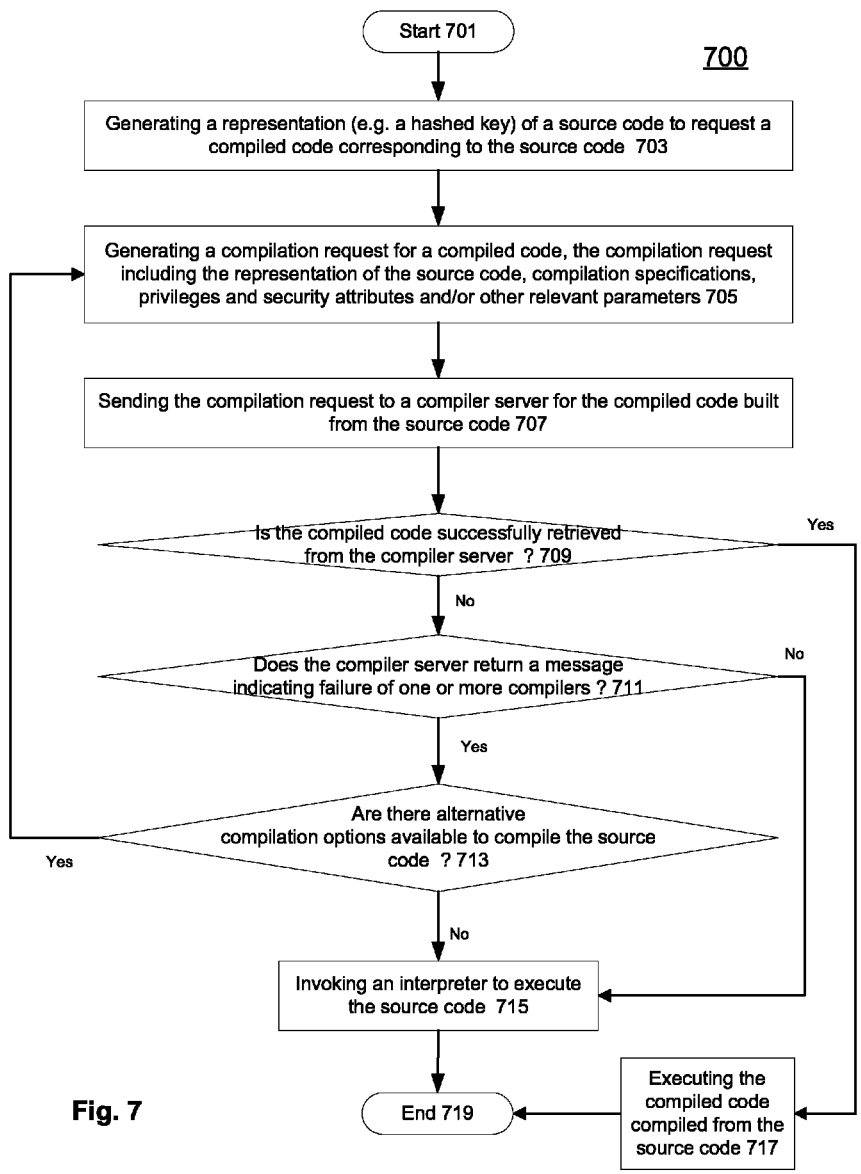
FIG. 7 is a flow diagram illustrating one embodiment of a process for an application to interface with a compiler server.

FIG. 7 is a flow diagram illustrating one embodiment of a process for an application to interface with a compiler server. Exemplary process 700 may be performed by a processing logic that may comprise hardware, software, or a combination of both. For example, process 700 may be performed by some components of system 300 of FIG. 3. In one embodiment, the processing logic of process 700 starts at block 701 to execute a source code. There can be alternative ways to execute a source code, such as compiler based or interpreter based executions. In some embodiments, multiple compiled code corresponding to one single source code (or computer program) are available for execution, each might differ in optimization level, security attributes and/or target processors. Typically, an interpreter based execution may be slower than a compiled code based execution. The processing logic of process 700 can request a compiled code for execution corresponding to the source code before invoking an interpreter based execution on the source code.

At block 703, the processing logic of process 700 can generate a representation of the source code, such as a hash key, a compressed source code, or other identifiers representing the whole source code (or program including multiple lines of codes). The processing logic of process 700 can generate a compilation request for a compiled code corresponding to the source code. The compilation request can include the representation of the source code, compilation specifications (e.g. preferences, suggested library paths, target processors etc.), privilege and authentication attributes (e.g. associated with a user) and/or other relevant parameters. The processing logic of process 700 can select which compilers are preferred to compile the source code according to preconfigured settings on available compilers capable of compiling the source code. In one embodiment, the processing logic of process 700 determines which available compilers are allowed to compile the source code according to authentication and/or privilege settings associated with the source code (e.g. user of the source code) and security requirements of a system.

The processing logic of process 700 can send a compilation request to a compiler server for a compiled code built from a source code at block 707. The compiler server can be a separate process locally or remotely coupled with the processing logic of process 700. The processing logic of process 700 can communicate with the compiler server via inter process communication mechanisms or based on network protocols. A plug-in library can provide APIs to interface with the compiler server. If the compiled code is successfully retrieved from the compiler server at block 709, the processing logic of process 700 can proceed to execute the compiled code at block 717. Otherwise, if the compiler server fails to return the compiled code without indicating any error, the processing logic of process 700 can invoke an interpreter to execute the source code at block 715. In one embodiment, the processing logic of process 700 waits for the compiler server to respond to the compilation request for a preset period of time. If no response messages are received after the preset period of time, the compiler server may fail and the processing logic of process 700 can ignore further responses to the compilation request from the compiler server.

If the compiler server returns an error message indicating errors in one or more compilers compiling a source code, the processing logic of process 700 can determine if there are alternative specifications or options available to compile the source code. For example, if compiling an OpenCL source code according to a certain hardware type fails, the processing logic of process 700 can choose a different hardware type for executing the OpenCL source code. If there are alternative compilers available, in one embodiment, the processing logic of process 700 repeats generating another compilation request for the compiler server at block 705. For example, the compiler server may return an error message indicating failure of OpenGL (Open Graphic Language) compiler specified in a compilation request to compile a source code. In response to the error message, the processing logic of process 700 may select an alternative compiler based on OpenCL. If no alternative compilers are available, the processing logic of process 700 may proceed to invoke an interpreter to execute the source code at block 715. The processing logic of process 700 can conclude executing the source code at block 719 by either an interpreter or executing a compiled code.

Figure 8:
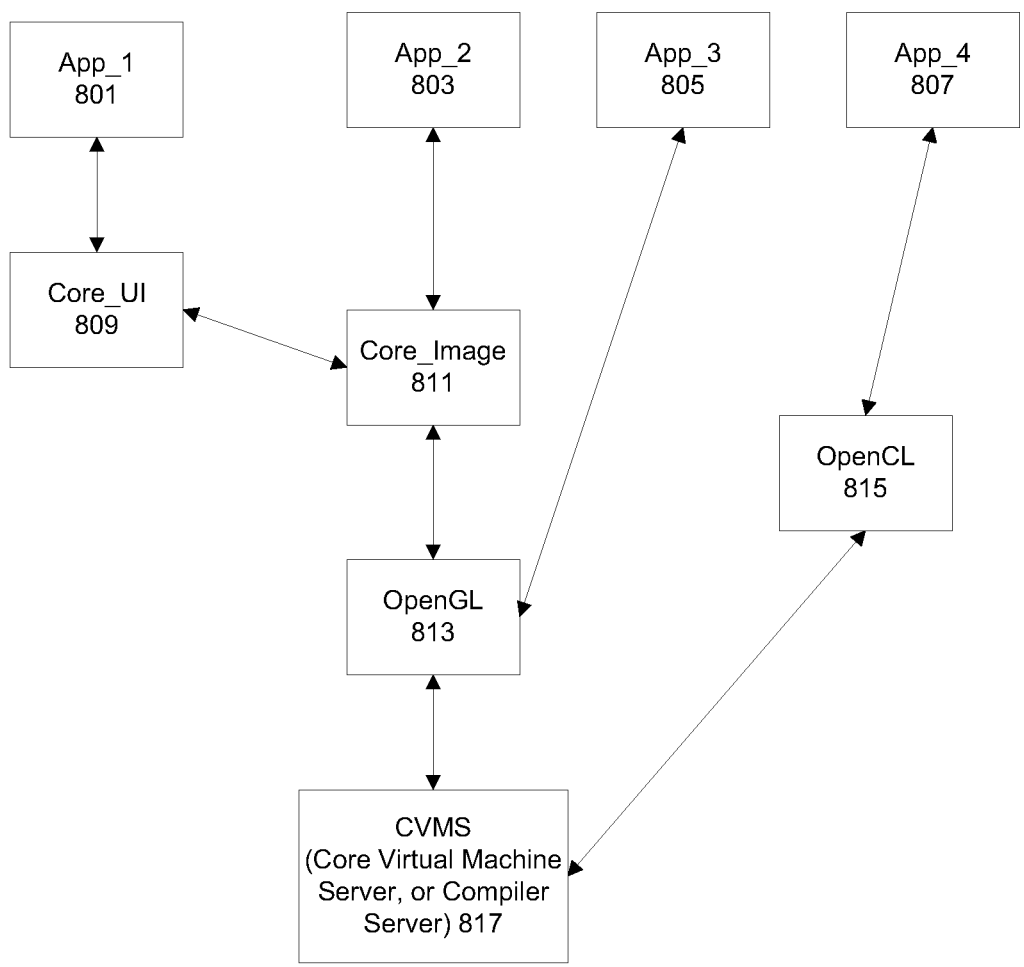
FIG. 8 illustrates examples of compilation paths for compilation requests to a compiler server.

FIG. 8 illustrates examples of compilation paths for compilation requests to a compiler server. Exemplary applications app_1 801, app_2 803, app_3 805 and app_4 807 may be separate application processes running in a system such as application_1 109, application_2 111 or application_n 113 in system 101 of FIG. 1B. Core_UI 809, Core_Image 811, OpenGL 813 or OpenCL 815 may include libraries, such as in libraries 135 of FIG. 1, and/or compilers, such as corresponding to compiler_1 121, compiler_2 123 and/or compiler_m 125 of FIG. 1B. A CVMS server (Core Virtual Machine Server) 817 may be a compiler server such as compiler server 117 of FIG. 1B. In one embodiment, application app_1 801 may send a compilation request to CVMS server 817 to compile a source code via an OpenGL compiler 813 using libraries paths including Core_UI 809 and Core_Image 811. Another compilation request from application app_2 803 to the CVMS server may specify compilation preferences to compile another source code associated with application app_2 803 using an OpenGL 813 compiler and a core_image 811 library. Applications app_3 805 and app_4 807 may send compilations requests to compile source codes using an OpengGL 813 compiler and an OpenCL 815 compiler respectively.

Figure 9:
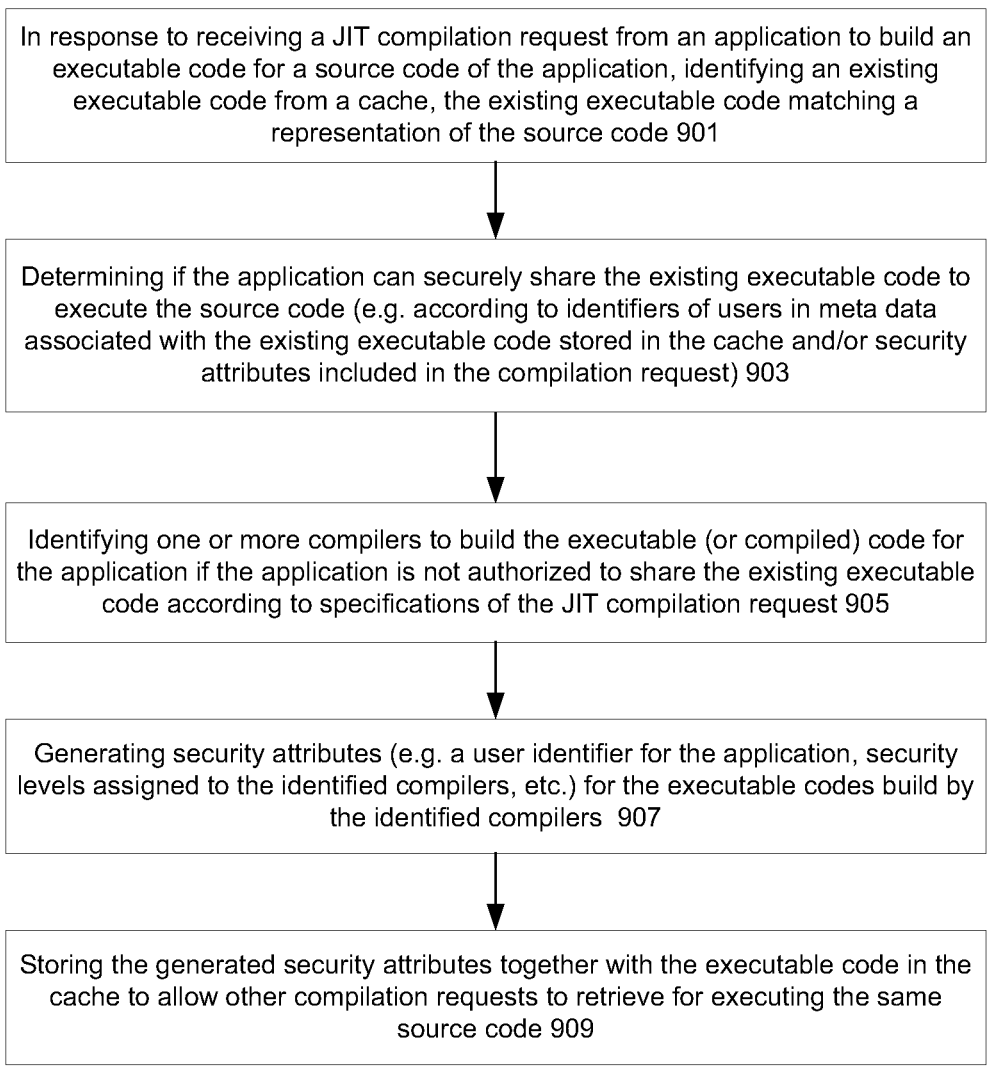
FIG. 9 is a flow diagram illustrating one embodiment of a process to generate compiled codes securely for a compilation request from an application.

FIG. 9 is a flow diagram illustrating one embodiment of a process to generate compiled codes securely for a compilation request from an application. Exemplary process 900 may be performed by a processing logic that may comprise hardware, software, or a combination of both. For example, process 900 may be performed by some components of system 200 of FIG. 2. In one embodiment, at block 901, the processing logic of process 900 identifies an existing executable (or compiled) code from a storage, such as cache 119 of FIG. 1, in response to a compilation request received from an application to compile a source code. Identification of the existing executable code may be based on a match between a representation of the source code and an index key associated with the executable code in the storage.

At block 903, the processing logic of process 900 can determine if an application can securely share an identified executable code to execute a source code. In one embodiment, a set of security rules constrain whether an application is allowed to execute previously compiled executable code corresponding to a source code of the application. The security rules may be based on security and/or authentication settings associated with the application and/or security settings stored as meta data along with the executable code in a cache. A compilation request from an application may include security settings for the application, such as a user identifier and/or authorization levels. A meta data associated with an executable code may indicate which compiler or compilers built the executable code, an identifier of the user associated with an original application requesting compilation of the executable code, and/or an authorization level associated with the original application etc. In one embodiment, a compiler is classified as secure or insecure in a preconfigured compiler setting. A secure compiler may be generate executable codes which does not corrupt by different inputs. The security rules may constrain a compiled code generated by an insecure compiler via a particular user from being shared by applications associated with other users. On the other hand, compiled codes built by secure compilers may be shared across different application processes independent of users. In one embodiment, security rules impose a constraint on sharing compiled codes on a per user and/or per application process basis.

At block 905, if it is determined that an application (or an application process) is not authorized to share an existing executable code to execute a source code, the processing logic of process 900 can identify one or more compilers to compile the source code. A compilation request can specify which compilers are preferred to compile the source code. The processing logic of process 900 can select a compiler compatible with privileges and/or security settings specified in the compilation request. In one embodiment, a compiler identified for compiling a source code can be different from the one specified in the compilation request due to privilege and/or security settings. In some embodiment, a request to compile a source code can be denied for an application for lack of certain privilege associated with a user of the application. The processing logic of process 900 can select one compiler over another overwriting a preference specified in a compilation request. For example, a secure (or trusted) compiler may have a preference over an insecure compiler if both compilers are capable of compiling the same source code. In one embodiment, if multiple executable codes compiled from a single source code have been cached with different compilation options (e.g. based on associated meta data), the processing logic of process 900 considers each cached executable code for secure sharing with an application before identifying compilers to compile the source code for the application.

Once an executable code is built (e.g. by a JIT compiler identified as compatible with a compilation request from an application), at block 907, the processing logic of process 900 can generate security attributes for the executable code. Security attributes may include which compiler (s) the executable code is built with, a security level associated with the compiler (e.g. a secure compiler or an insecure compiler), and/or a user identifier for the application requesting the executable code, etc. At block 909, the processing logic stores the generated security attributes as meta data together with the executable code in a cache to allow sharing with applications having security settings compatible with the security attributes specified in the meta data.

FIG. 10 is a flow diagram illustrating one embodiment of a process to securely generate a compilation request for an application to compile a source code. Exemplary process 1000 may be performed by a processing logic that may comprise hardware, software, or a combination of both. For example, process 1000 may be performed by some components of system 300 of FIG. 3. In one embodiment, at block 1001, the processing logic of process 1000 selects one or more compilers (e.g. JIT compilers) to compile a source code for an application to execute during run time. Compilers or paths of compilers for building an executable code from a source code of an application can be identified according to settings preconfigured for a system and/or a preference specified by the application. In one embodiment, the processing logic of process 1000 filters the compilers capable of compiling the source code for an application according to privilege and/or security settings associated with the application. A privilege and/or security setting may indicate whether an application is authorized for a particular compiler, whether a particular compiler option (e.g. which processor architecture) is allowed, and/or an identifier of a user associated with the application. In some embodiments, a privilege and/or security setting prohibits an application from compiling a source code for execution (e.g. the user of the application does not have permission or privilege to access a compiler during run time).

The processing logic of process 1000 can generate a JIT compilation request according to selected compilers at block 1003. A JIT compilation request can include specifications indicating a path of compilers (e.g. a list or a sequence of compiler identifiers) allowed to compile the source code. The specifications can include privilege and/or security settings associated with the application. In one embodiment, the processing logic of process 1000 generates a JIT compilation request to specify an alternative path of compilers allowed to compile the source code, e.g. a different set of compilers than specified in a previous compilation request, when the previous compilation request fails to retrieve an executable code for the source code (e.g. via a compiler server). If no compilers allowed for an application (e.g. according to privilege and/or security settings) are available to compile a source code, the processing logic of process 1000 can indicate to the application to execute the source code via an interpreter. Otherwise, at block 1005, the processing logic of process 1000 can send a JIT compilation request to a compiler server to request an executable code built from a source code for an application based on specifications included in the compilation request.

In one embodiment, prior to sending a compilation request, the processing logic of process 1000 can verify a compiler server is trusted. In one embodiment, the processing logic of process 1000 can retrieve an indication from a system to verify whether the compiler server is trusted. If the system does not indicate the compiler server is trusted, in one embodiment, the processing logic of process 1000 performs cryptographic operations (e.g. based on public and private key security infrastructure) to verify a trust of the compiler server. The processing logic of process 1000 can invoke an interpreter to execute a source code if a trust of a compiler server cannot be verified.

Figure 11:
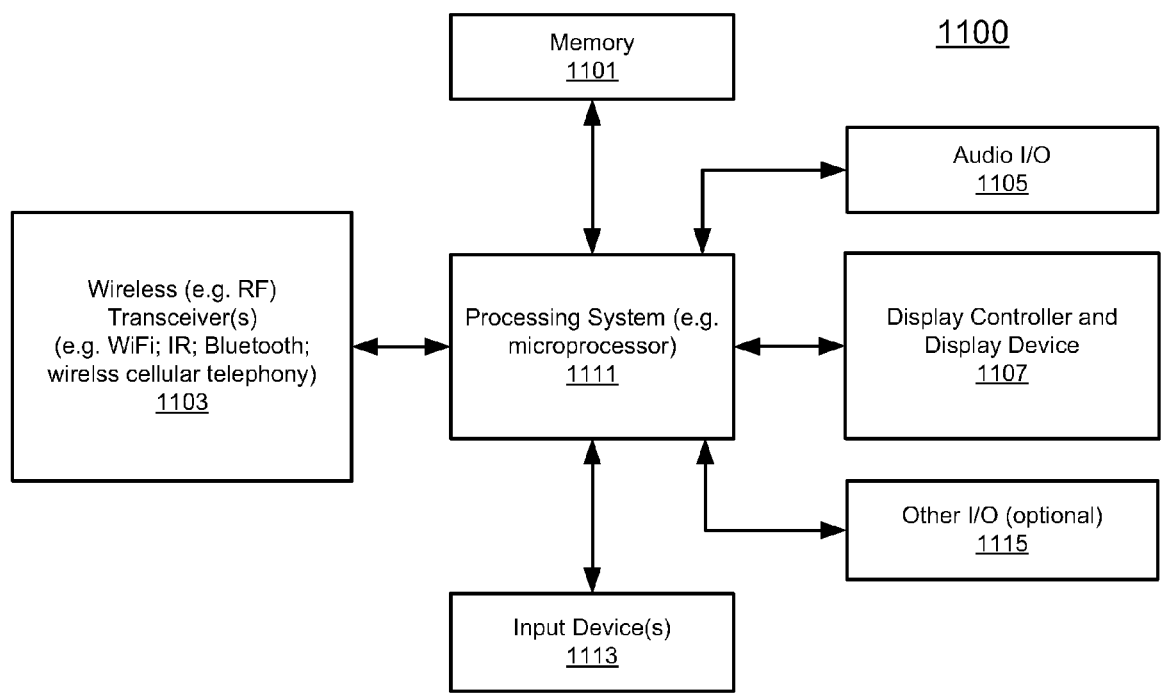
FIG. 11 illustrates one example of a data processing system which may be used in one embodiment of the present inventions.

FIG. 11 shows an example of a data processing system 1100 which may be used with one embodiment of the present invention. For example, system 1100 may be implemented as part of system as shown in FIG. 1B. The data processing system 1100 shown in FIG. 11 includes a processing system 1111, which may be one or more microprocessors, or which may be a system on a chip integrated circuit and the system also includes memory 1101 for storing data and programs for execution by the processing system. The system 1100 also includes an audio input/output subsystem 1105 which may include a microphone and a speaker for, for example, playing back music or providing telephone functionality through the speaker and microphone.

A display controller and display device 1107 provide a visual user interface for the user; this digital interface may include a graphical user interface which is similar to that shown on a Macintosh computer when running OS X operating system software. The system 1100 also includes one or more wireless transceivers 1103 to communicate with another data processing system, such as the system 1100 of FIG. 11. A wireless transceiver may be a WiFi transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system.

The data processing system 1100 also includes one or more input devices 1113 which are provided to allow a user to provide input to the system. These input devices may be a keypad or a keyboard or a touch panel or a multi touch panel. The data processing system 1100 also includes an optional input/output device 1115 which may be a connector for a dock. It will be appreciated that one or more buses, not shown, may be used to interconnect the various components as is well known in the art. The data processing system shown in FIG. 11 may be a handheld computer or a personal digital assistant (PDA), or a cellular telephone with PDA like functionality, or a handheld computer which includes a portable gaming device, or a cellular telephone, or a media player, such as an iPod, or devices which combine aspects or functions of these devices, such as a media player combined with a PDA and a cellular telephone in one device. In other embodiments, the data processing system 1100 may be a network computer or an embedded processing device within another device, or other types of data processing systems which have fewer components or perhaps more components than that shown in FIG. 11.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Figure 12:
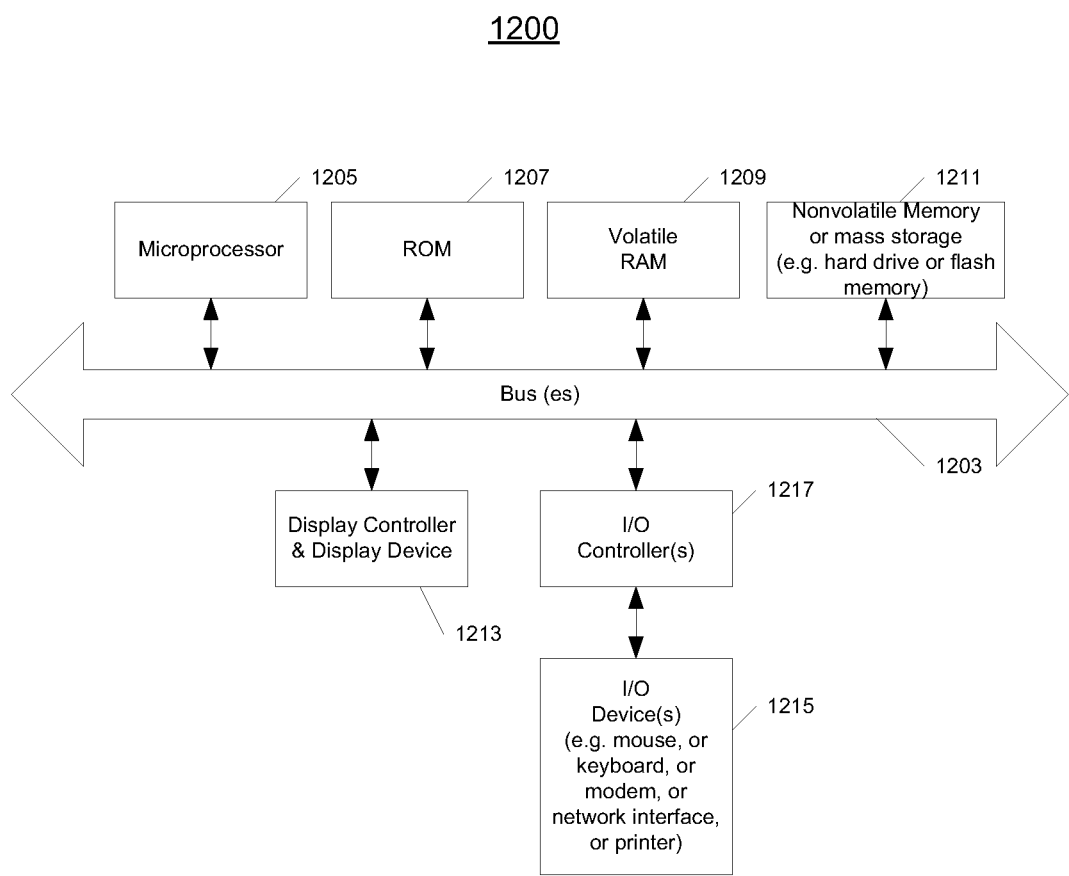
FIG. 12 illustrates one example of another data processing system such as a computer system, which may be used in conjunction with the embodiments described herein.

FIG. 12 shows one example of another data processing system such as a computer system, which may be used with one embodiment the present invention. For example, the system 1200 may be implemented as a part of the system shown in FIG. 1. Note that while FIG. 12 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 12, the computer system 1200, which is a form of a data processing system, includes a bus 1203 which is coupled to a microprocessor(s) 1205 and a ROM (Read Only Memory) 1207 and volatile RAM 1209 and a non-volatile memory 1211. The microprocessor 1205 may retrieve the instructions from the memories 1207, 1209, 1211 and execute the instructions to perform operations described above. The bus 1203 interconnects these various components together and also interconnects these components 1205, 1207, 1209, and 1211 to a display controller and display device 1213 and to peripheral devices such as input/output (I/O) devices which may be mice, keyboards, modems, network interfaces, printers and other devices which are well known in the art. Typically, the input/output devices 1215 are coupled to the system through input/output controllers 1217. The volatile RAM (Random Access Memory) 1209 is typically implemented as dynamic RAM (DRAM) which requires power continually in order to refresh or maintain the data in the memory.

The mass storage 1211 is typically a magnetic hard drive or a magnetic optical drive or an optical drive or a DVD RAM or a flash memory or other types of memory systems which maintain data (e.g. large amounts of data) even after power is removed from the system. Typically, the mass storage 1211 will also be a random access memory although this is not required. While FIG. 12 shows that the mass storage 1211 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1203 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method, comprising:

in response to receiving a compilation request from an application to compile a source code, the compilation request including a preference to compile the source code, searching a cache for a compiled code that satisfies the compilation request, wherein the compilation request comprises security settings associated with the application, wherein the security settings associated with the application comply with security metadata in the compiled code if the compiled code satisfies the compilation request; and sending a particular reply message including the compiled code to the application in response to the compilation request if the compiled code that satisfies the compilation request is available from the cache, wherein if the compiled code that satisfies the compilation request is not found within the cache, performing:

selecting a compiler from a plurality of compilers based on the preference of the compilation request, wherein the compiler is configured to compile source codes from a plurality of independent client applications;

instructing the compiler to build the compiled code from the source code for the compilation request;

detecting if the compiler fails to build the compiled code for the compilation request or if the compiler has successfully built the compiled code;

sending a reply message to the application in response to the compilation request, wherein the reply message includes the compiled code if the compiled code is successfully built for the compilation request, wherein the reply message indicates failure of the compiler if the compiler fails to build the compiled code for the compilation request;

automatically receiving, in response to the reply message indicating the failure, an alternative compilation request including an alternative preference from the application to compile the source code, wherein the alternative compilation request comprises the security settings associated with the application, the alternative compilation request indicating an alternative compiler allowed to compile the source code;

selecting the alternative compiler from the compilers based on the alternative compilation request to build the compiled code according to the alternative preference, wherein the alternative compiler matches the security settings of the application;

compiling the source code using the alternative compiler;

providing the application with an alternative reply including the compiled code built for the alternative compilation request; and storing a copy of the compiled code with the security metadata, wherein the compiled code is available for future compilation request.

2. The method of claim 1, wherein each of the plurality of compilers are loaded in separate processes.

3. The method of claim 1, wherein the compilation request is received over a network connection remotely coupled with the application.

4. The method of claim 1, wherein the application is to execute the compiled code from the source code and the compilation request is a JIT (just in time) compilation for the compiled code and wherein a compiler server performs the searching, the instructing, and the providing for the application and the plurality of independent client applications.

5. The method of claim 1, wherein the compilation request includes a representation of the source code and wherein the searching comprises:

identifying one or more compiled codes from the cache according to the representation.

6. The method of claim 5, wherein the representation is a key hashed from the source code.

7. The method of claim 5, wherein the compilation request includes compilation options, wherein each of the identified one or more compiled codes is associated with meta data, the method further comprising:

determining if the meta data is compatible with the compilation options.

8. The method of claim 7, wherein the compilation options include a specification of a target processor architecture for the compiled code.

9. The method of claim 5, wherein providing the application with the reply comprises:

in response to receiving the compiled code from the one or more compilers, storing the compiled code into the cache, wherein the compiled code is indexed in the cache according to the representation.

10. The method of claim 9, further comprising:

generating the meta data for the compiled code according to the compilation request; and storing the meta data associated with the compiled code in the cache.

11. The method of claim 1, wherein instructing the compiler comprises:

determining a status for the compiler, the status indicating if the compiler is running in a process; and invoking the process to load the compiler if the status indicates the compiler is not loaded.

12. The method of claim 11, wherein the compiler is associated with a request queue, wherein the compiler retrieves requests from the request queue to perform compilation tasks, the method further comprising:

generating a request to compile the source code according to the compilation request; and appending the request to the request queue for the compiler to compile the source code.

13. A machine-readable non-transitory storage medium having instructions, when executed by a machine, cause the machine to perform a method comprising:

in response to receiving a compilation request from an application to compile a source code, the compilation request including a preference to compile the source code, searching a cache for a compiled code that satisfies the compilation request, wherein the compilation request comprises security settings associated with the application, wherein the security settings associated with the application comply with security metadata in the compiled code if the compiled code satisfies the compilation request; and sending a particular reply message including the compiled code to the application in response to the compilation request if the compiled code that satisfies the compilation request is available from the cache, wherein if the compiled code that satisfies the compilation request is not found within the cache, performing:

selecting a compiler from a plurality of compilers based on the preference of the compilation request, wherein the compiler is configured to compile source codes from a plurality of independent client applications;

instructing the compiler to build the compiled code from the source code for the compilation request;

detecting if the compiler fails to build the compiled code for the compilation request or if the compiler has successfully built the compiled code;

sending a reply message to the application in response to the compilation request, wherein the reply message includes the compiled code if the compiled code is successfully built for the compilation request, wherein the reply message indicates failure of the compiler if the compiler fails to build the compiled code for the compilation request;

automatically receiving, in response to the reply message indicating the failure, an alternative compilation request including an alternative preference from the application to compile the source code, wherein the alternative compilation request comprises the security settings associated with the application, the alternative compilation request indicating an alternative compiler allowed to compile the source code;

selecting the alternative compiler from the compilers based on the alternative compilation request to build the compiled code according to the alternative preference, wherein the alternative compiler matches the security settings of the application;

compiling the source code using the alternative compiler;

providing the application with an alternative reply including the compiled code built for the alternative compilation request; and storing a copy of the compiled code with the security metadata, wherein the compiled code is available for future compilation request.

14. An apparatus, comprising:

a memory storing executable instructions;

a cache storing one or more compiled codes indexed according representations of source codes respectively corresponding to the compiled codes; and a processor coupled to memory and the cache, the processor being configured to execute the executable instructions from the memory to:
  in response to receiving a compilation request from an application to compile a source code, the compilation request including a preference to compile the source code, search the cache for a compiled code that satisfies the compilation request, wherein the compilation request comprises security settings associated with the application, wherein the security settings associated with the application comply with security metadata in the compiled code if the compiled code satisfies the compilation request, and
  send a particular reply message including the compiled code to the application in response to the compilation request if the compiled code that satisfies the compilation request is available from the cache,
  wherein if the compiled code that satisfies the compilation request is not found within the cache, the processor is configured to perform:
    selecting a compiler from a plurality of compilers based on the preference of the compilation request, wherein the compiler is configured to compile source codes from a plurality of independent client applications,
    instructing the compiler to build the compiled code from the source code for the compilation request,
    detecting if the compiler fails to build the compiled code for the compilation request or if the compiler has successfully built the compiled code,
    sending a reply message to the application in response to the compilation request, wherein the reply message includes the compiled code if the compiled code is successfully built for the compilation request,
    automatically receiving, in response to the reply message indicating the failure, an alternative compilation request including an alternative preference from the application to compile the source code, wherein the alternative compilation request comprises the security settings associated with the application, the alternative compilation request indicating an alternative compiler allowed to compile the source code,
    selecting the alternative compiler from the compilers based on the alternative compilation request to build the compiled code according to the alternative preference, wherein the alternative compiler matches the security settings of the application,
    compiling the source code using the alternative compiler,
    providing the application with an alternative reply including the compiled code built for the alternative compilation request, and
    storing a copy of the compiled code with the security metadata, wherein the compiled code is available for future compilation request.

15. A computer implemented method, comprising:
  in response to receiving a JIT (Just In Time) compilation request from an application to compile a source code, sending a particular reply message including a compiled code that satisfies the JIT compilation request to the application if the compiled code is available from a cache, the JIT compilation request comprising security settings associated with the application, wherein the security settings associated with the application comply with security metadata in the compiled code if the compiled code satisfies the JIT compilation request,
  wherein if the compiled code that satisfies the JIT compilation request is not available within the cache, performing:
    identifying a compiler to compile the source code for the application according to the JIT compilation request from the application;
    determining if the identified compiler is currently loaded in a memory;
    invoking the identified compiler into the memory, if the identified compiler is not yet loaded, the identified compiler corresponding to a process created uniquely for the identified compiler;
    sending the JIT compilation request to the process corresponding to the identified compiler to compile the source code;
    detecting if the identified compiler fails to build the compiled code for the JIT compilation request or if the compiler has successfully built the compiled code;
    sending a reply message to the application in response to the JIT compilation request, wherein the reply message includes the compiled code if the compiled code is successfully built for the JIT compilation request, wherein the reply message indicates failure of the compiler if the compiler fails to build the compiled code for the JIT compilation request;
    automatically receiving, in response to the reply message indicating the failure, an alternative compilation request from the application to compile the source code wherein the alternative compilation request comprises the security settings associated with the application, the alternative compilation request indicating an alternative compiler allowed to compiled the source code;
    identifying the alternative compiler according to the alternative compilation request to compile the source code, wherein the alternative compiler matches the security settings of the application;
    compiling the source code using the alternative compiler;
    providing the application with the alternative reply including the compiled code built for the alternative compilation request; and
    storing a copy of the compiled code with the security metadata, wherein the compiled code is available for future compilation request.

16. The method of claim 15,
  wherein the notification to the application is based on inter process communication with the application.

17. The method of claim 16, wherein the failure indicates the identified compiler has been unloaded from the memory.

18. The method of claim 16, wherein the security settings comprise at least one of a user identifier and an authorization level.

19. A machine-readable non-transitory storage medium having instructions, when executed by a machine, cause the machine to perform a method, the method comprising:
  in response to receiving a JIT (Just In Time) compilation request from an application to compile a source code, sending a particular reply message including a compiled code that satisfies the JIT compilation request to the application if the compiled code is available from a cache, the JIT compilation request comprising security settings associated with the application, wherein the security settings associated with the application comply with security metadata in the compiled code if the compiled code satisfies the JIT compilation request,
wherein if the compiled code that satisfies the JIT compilation request is not available within the cache, performing:
identifying a compiler from a plurality of compilers to compile the source code according to a preference of the JIT compilation request received from the application;
determining if the identified compiler is currently loaded in a memory;
invoking the identified compiler into the memory, if the identified compiler is not yet loaded, the identified compiler corresponding to a process uniquely created for the identified compiler;
sending the JIT compilation request to the process corresponding to the identified compiler to compiled the source code;
detecting if the identified compiler fails to build the compiled code for the compilation request or if the compiler has successfully built the compiled code;
sending a reply message to the application in response to the compilation request, wherein the reply message includes the compiled code if the compiled code is built successfully, wherein the reply message indicates failure of the compiler if the compiler fails to build the compiled code for the JIT compilation request;
automatically receiving, in response to the reply message indicating the failure, an alternative compilation request from the application to compile the source code wherein the alternative compilation request comprises the security settings associated with the application, the alternative compilation request indicating an alternative compiler allowed to compiled the source code;
identifying the alternative compiler according to the alternative compilation request to compile the source code, wherein the alternative compiler matches the security settings of the application;
compiling the source code using the alternative compiler;
providing the application with the alternative reply including the compiled code built for the alternative compilation request; and
storing a copy of the compiled code with the security metadata, wherein the compiled code is available for future compilation request.

20. A machine-readable non-transitory storage medium having instructions, when executed by a machine, cause the machine to perform a method, method comprising:
receiving, at a compiler server, a first run time compilation request from a first application which is executing to compile a first source code that satisfies the first run time compilation request, the first run time compilation request including a first preference to compile the source code, wherein the first run time compilation request comprises security settings associated with the application and wherein the security settings associated with the application comply with security metadata of the compiled code if the compiled code satisfies the compilation request; and
sending a particular reply message including the compiled code to the application in response to the first run time compilation request if the compiled code that satisfies the compilation request is available from a cache,
wherein if the compiled code that satisfies the compilation request is not available within the cache, performing:
selecting a first one of one or more compilers based on the first preference of the first run time compilation request, each compiler loaded in a separate process, each compiler capable of building compiled code from the first source code;
storing the first compilation request in a queue for the first compiler to compile the first source code to build the compiled code, wherein the queue is capable of storing a second run time compilation request received from a second application which is executing to compile a second source code;
detecting if the first compiler has been unloaded without building the compiled code for the first run time compilation request of if the first compiler has successfully built the compiled code;
sending a reply to the first application in response to the first run time compilation request, wherein the reply includes the compiled code if the compiled code is successfully built for the first compilation request, wherein the reply indicates there is an error for the first preference of the first run time compilation request if the first compiler has been unloaded;
automatically receiving, in response to the sending of the reply indicating the error, an alternative compilation request from the first application to compile the source code, wherein the alternative compilation request includes an alternative preference to compile the source code, wherein the alternative compilation request comprises the security settings associated with the application, the compilation request indicating an alternative compiler allowed to compile the source code;
selecting the alternative compiler from the compilers based on the alternative compilation request to build the compiled code according to the alternative preference of the alternative compilation request;
compiling the source code using the alternative compiler;
providing the application with an alternative reply including the compiled code built for the alternative compilation request;
storing a copy of the compiled code in the cache with security metadata, wherein the compiled code is available for future compilation request;
determining, subsequent to the detection that the first compiler has been unloaded, if the queue associated with the first compiler is not empty including at least the second run time compilation request; and
automatically reloading the first compiler to build compiled code from the second source code for the second run time compilation request if the queue is determined not empty.

* * * * *